United States Patent [19]
Ogiro et al.

[11] Patent Number: 4,485,990
[45] Date of Patent: Dec. 4, 1984

[54] RECORDING TAPE CASSETTE

[75] Inventors: Kenji Ogiro, Kanagawa; Shinichi Gotoh, Kyoto, both of Japan

[73] Assignees: Hitachi Maxell, Ltd., Osaka; Hitachi, Ltd., Tokyo, both of Japan

[21] Appl. No.: 473,751

[22] Filed: Mar. 9, 1983

[30] Foreign Application Priority Data

Mar. 10, 1982 [JP] Japan .............................. 57-34263[U]
Jun. 4, 1982 [JP] Japan .............................. 57-83688[U]

[51] Int. Cl.³ ........................ G03B 1/04; G11B 15/32
[52] U.S. Cl. ................................... 242/199; 220/334
[58] Field of Search ............................. 242/197–200; 220/326, 334, 339; 360/85, 95, 132, 137; 352/72, 78

[56] References Cited

U.S. PATENT DOCUMENTS

| | | | |
|---|---|---|---|
| 2,941,741 | 6/1960 | Bilsback | 242/198 |
| 3,809,219 | 5/1974 | Esashi | 220/326 |
| 3,950,787 | 4/1976 | Hosaka | 360/137 |
| 3,980,255 | 9/1976 | Serizawa | 242/198 |
| 4,323,207 | 4/1982 | Gebeke | 242/198 |

*Primary Examiner*—Leonard D. Christian
*Attorney, Agent, or Firm*—Birch, Stewart, Kolasch & Birch

[57] ABSTRACT

A recording tape cartridge which comprises a cartridge case and a lid member, having a front plate, rotatably mounted on the cartridge case so as to be rotatable between a closed position and an opened position. An opening is defined in the bottom portion of the front plate of the lid member for receiving a standard pin of a recording device and butting means projecting from the front end of the bottom wall of the cartridge case to protrude into the opening of the lid member up to a position substantially corresponding to one half the thickness of the front plate when the lid member is in the closed position.

3 Claims, 11 Drawing Figures

RECORDING TAPE CASSETTE

FIELD OF THE INVENTION

The present invention relates to a recording tape cartridge which has a lid member pivotally connected to its front surface for covering and protecting a recording tape accommodated therein.

BACKGROUND OF THE INVENTION

In a conventional video tape cartridge of the above-mentioned type which is mounted in a recording/reproducing apparatus, a recess is formed in the lower end portion of the front surface of a front lid member so that a member provided in the recording/reproducing apparatus for restricting insertion of the tape cartridge is brought into contact with a part of a cartridge case exposed through the recess when the tape cartridge is mounted in the recording/reproducing apparatus.

However, as the tape cartridge is repeatedly inserted in and detached from the recording/reproducing apparatus, the part of the cartridge case exposed through the recess tends to be abraded or scratched as a result of being in contact with the insertion restricting member, leading to unsightly abrasion or scratches on the exposed part. Further, dust or dirt is apt to enter the interior of the front lid member through the recess and to stick to the recording tape.

SUMMARY OF THE INVENTION

An essential object of the present invention is to provide a recording tape cartridge which effectively prevents dust and/or dirt from entering inside the cartridge case in a simple construction thereby assuring excellent recording/reproducing characteristics of a recording tape.

Another object of the present invention is to provide a recording tape cartridge in which abrasion and/or scratches on the front surface thereof are inconspicuous.

DESCRIPTION OF THE PREFERRED EMBODIMENT

Figure 1:
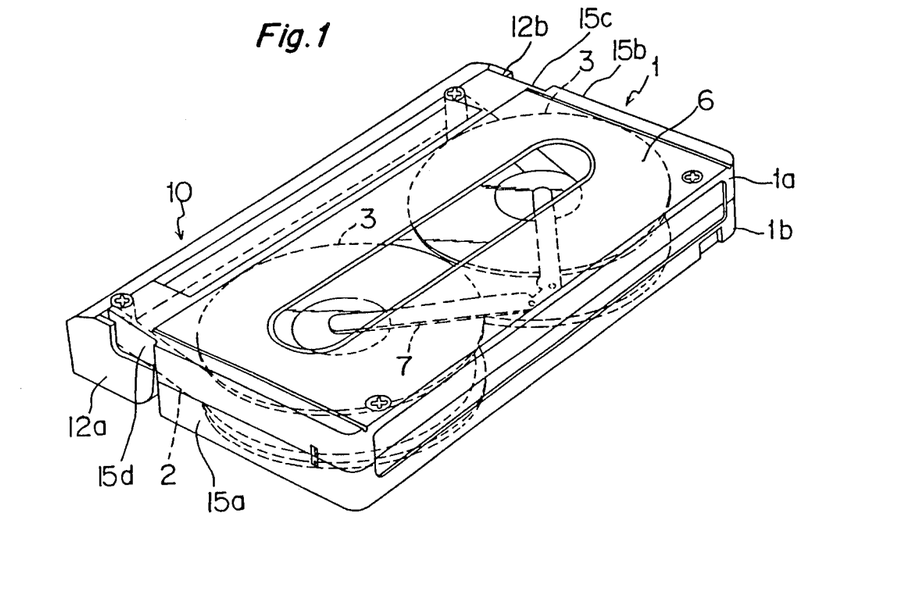
FIG. 1 is a perspective view of a tape cartridge according to the present invention.
Figure 2:
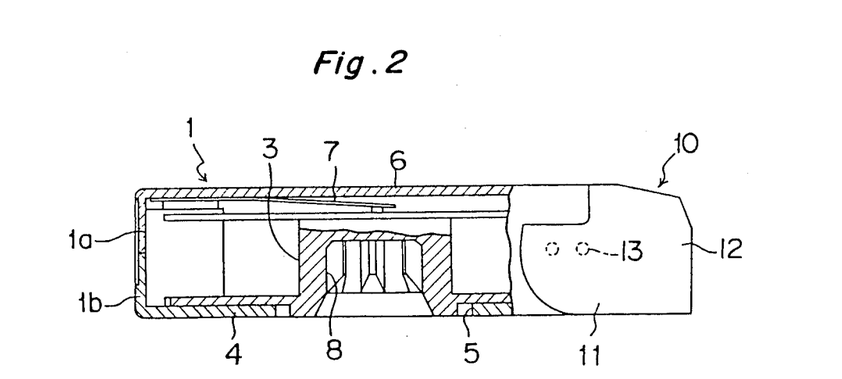
FIG. 2 is a partially fragmented cross sectional view of the tape cartridge shown in FIG. 1.
Figure 3:
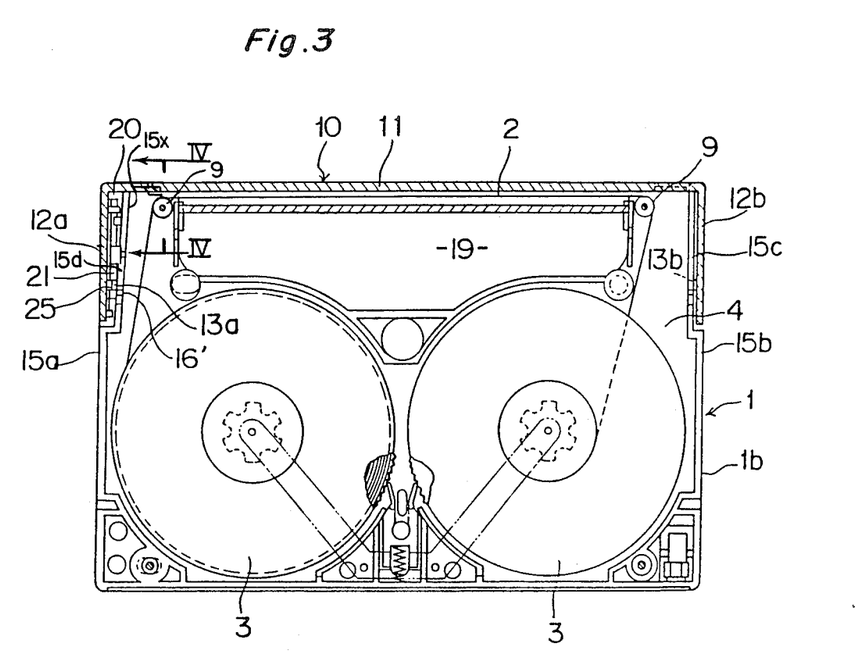
FIG. 3 is a top plan view showing the internal construction of the tape cartridge.

Referring to FIGS. 1 through 3 of the drawings, there is shown a video tape cartridge according to the present invention, which comprises a cartridge case 1 formed of a plastic resin material and consisting of a top section 1a and a bottom section 1b connected with each other by screws (not shown) and a pair of tape reels 3 contained therein for winding a magnetic recording tape 2 for recording and/or reproducing video signals. The tape reels 3 are downwardly pressed at their centers of rotation by a plate spring 7 which is secured to the inner surface of an upper wall member 6 of the cartridge case 1 in positions corresponding to a pair of drive shaft insertion holes 5 defined through a bottom wall member 4 of the cartridge case 1, so that, when the cartridge case 1 is mounted in a video tape recorder (not shown), drive shafts (not shown) of the video tape recorder are inserted in and engaged with hub holes 8 of the tape reels 3 through the insertion holes 5. A pair of tape guide members 9 are provided on both sides in the front part of the cartridge case 1 so that the magnetic recording tape 2 is drawn out from one tape reel 3 to extend along the front surface of the cartridge case 1 and wound around the other tape reel 3 through the guide members 9.

A front lid member 10 is pivotally connected to the cartridge case 1 in a manner capable of being opened and closed, so as to cover the front surface of the cartridge case 1 and protect the magnetic recording tape 2 exposed along the front surface.

The front lid member 10 is formed of a plastic resin material, and comprises a front plate 11 for covering the entire front surface of the cartridge case 1 along the longitudinal direction, a pair of connecting members 12a and 12b rearwardly projecting from both ends of the front plate 11 and a pair of pivotal shafts 13a and 13b inwardly projecting from the connecting members 12a and 12b to be opposed to each other. The connecting members 12a and 12b are engaged with stepped wall members 15c and 15d defined in front portions of a pair of side wall 15a and 15b in a manner stepped inwardly of the side walls 15a and 15b while the pivotal shafts 13a and 13b are rotatably engaged in throughholes 16 defined through the stepped wall members 15c and 15d. By virtue of this construction, the front lid member 10 is pivotally rotatable about the pivotal shafts 13a and 13b between a closed position for covering the front surface of the cartridge case 1 and an upward opened position. Further, as hereinafter described in detail, the front lid member 10 is urged by a torsion spring 17 (FIG. 5) to be in the closed position. Thus, when the video tape cartridge is not used, the front lid member 10 is in the closed position to cover and protect the outer front surface of the magnetic recording tape 2. On the other hand, when the video tape cartridge is mounted in the video tape recorder, the front lid member 10 is so opened that a tape loading pin (not shown) of the video tape recorder is inserted in a pocket member 19 recessedly formed in the front surface of the cartridge case 1 to draw out the magnetic recording tape 2 frontwardly from the cartridge case 1.

Between the stepped wall member 15d of the lefthand side wall 15b of the cartridge case 1 and the left-hand connecting member 12b of the front lid member 10, there is defined a clearance 20, which contains a member for locking the front lid member 10 in the closed position when the video tape cartridge is not used.

Figure 5:
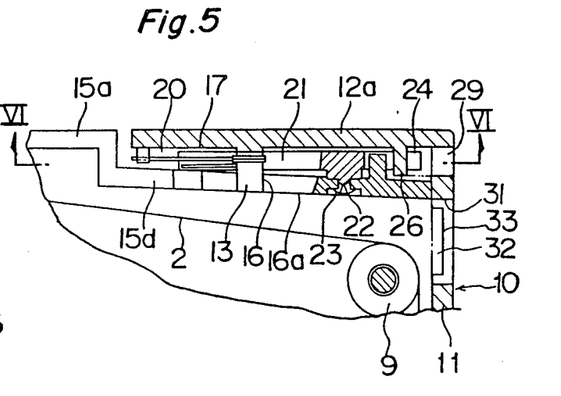
FIG. 5 is a partially enlarged top plan view showing a locking member.
Figure 6:
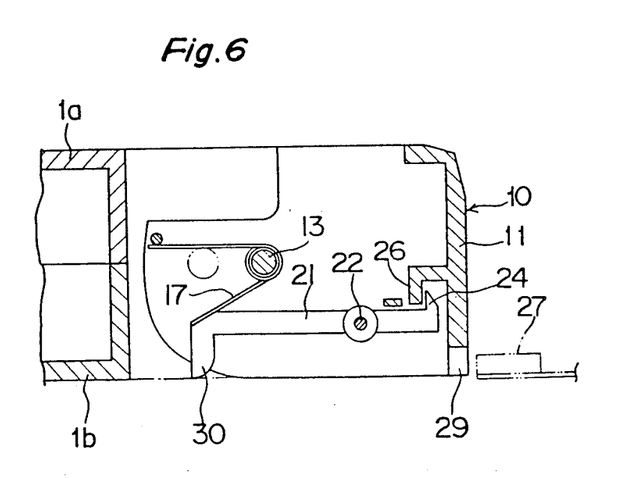
FIG. 6 is a cross sectional view taken along the line VI—VI in FIG. 5.

FIGS. 5 and 6 show the means for locking the front lid member 10 in the closed position. The stepped wall member 15d is slanted frontwardly toward the interior of the cartridge case 1 in top plan view, so that the clearance 20 extends frontwardly to have its rear portion narrowed and front portion widened. A locking member 21 is arranged within the clearance 20.

The locking member 21 has a shaft 22 laterally projecting from the longitudinal center thereof, which is engagedly and rotatably supported by a bearing opening 23 defined through the stepped wall member 15d so that a forward engaging portion 24 of the locking member 21 is vertically rotated about the shaft 22. An L-shaped engaging member 26 which projects downward is formed in the inner surface of the front plate 11, and an end of the torsion spring 17 is brought into contact with the rear end portion of the locking member 21 to urge the same such that the front engaging portion 24 thereof is engaged, from below, with the engaging member 26. When the video tape cartridge is not used, thus, the front engaging portion 24 of the locking member 21 continuously engaged the engaging member 26 of the front lid member 10 in the closed position, to prevent the front lid member 10 from being rotated about the pivotal shafts 13 toward the opened position. On the other hand, when the video tape cartridge is mounted in the video tape recorder in a proper condition, a locking release member 27 provided in the video tape recorder, which also functions to prevent erroneous mounting of the video tape cartridge, is relatively guided from the front direction to enter the clearance 20 through an opening 29 recessedly formed through the lower end of the front plate 11 to press a member 30 projecting downward from the rear end of the locking member 21. Thus, the forward engaging portion 24 of the locking member 21 is moved downward against the torsion spring 17 to be disengaged from the engaging member 26, thereby releasing the front lid member 10 from the closed condition.

Since the clearance 20 is widened toward the forward end portion and narrowed toward the rear end portion, even if the video tape cartridge is mounted in the video tape recorder in a laterally deviating condition, the locking release member 27 is smoothly guided into the clearance 20, and is properly brought into contact with the member 30 of the locking member 21. When the video tape cartridge is mounted in the video tape recorder in a laterally or vertically inverted condition, the locking release member 27 is not coincident with the opening 29 and is brought into contact with a portion other than the same, thereby preventing erroneous mounting of the video tape cartridge.

Since the stepped wall member 15d of the left-hand side wall 15a has its inner surface 15x frontwardly slanted, in top plan view, toward the interior of the cartridge case 1, the magnetic recording tape 2 brought into contact with the inner surface 15x contingently in a condition loosened between the tape guide members 9 is effectively drawn in the interior of the cartridge case 1 and prevented from being loosened along the front surface of the cartridge case 1.

Figure 4:
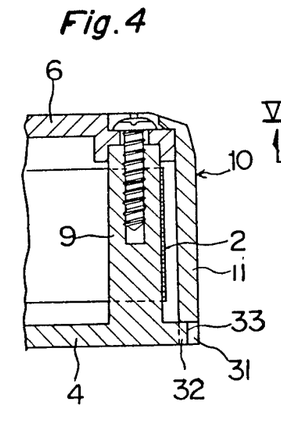
FIG. 4 is a cross sectional view taken along the line IV—IV in FIG. 3.
Figure 7:
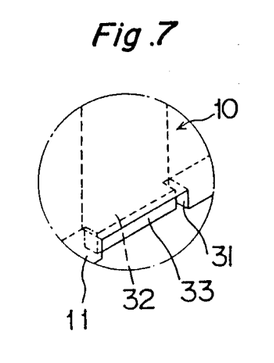
FIG. 7 is a partial perspective view showing a recess formed in the front lid member and a projection formed in the cartridge case.

As shown in FIGS. 4 and 7, the front lid member 10 defines a pair of recesses 31 each in the form of an elongated slot in portions close to both lateral ends of the front plate 11 while the cartridge case 1 is provided in the front edge of its bottom wall member 4 with a pair of projections 32 having an elongated rectangular shape in front view, which protrude into the recesses 31 of the front lid member 10 in the closed position. Each of the projections 32 is so protruded that its forward butting surface 33 is positioned at one half the thickness of the front plate 11. Thus, when the video tape cartridge is mounted in the video tape recorder with the front lid member 10 being closed, insertion restricting members provided in the video tape recorder are respectively brought into contact with the forward butting surfaces 33 of the projections 32 facing the recesses 31 of the front lid member 10, thereby restricting insertion of the video tape cartridge in the video tape recorder. As shown in the embodiment, the projections 32 are preferably provided in positions close to both ends of the front lid member 10 to be in contact with insertion restricting members in two positions so that the insertion depth of the video tape cartridge in the video tape recorder is steadily restricted.

As hereinabove described, the projections 32 for being in contact with the insertion restricting member of the video tape recorder are so formed in the video tape cartridge that the forward butting surfaces 33 thereof are positioned, in the recesses 31 of the front lid member 10, up to one half the thickness of the front plate 11. Therefore, even if the forward butting surfaces 33 of the projections 32 are abraded or scratched upon repeated contact with the insertion restricting member of the video tape cartridge, such abrasion or scratches are inconspicuous since the butting surfaces 33 are formed inwardly of the front surface of the front plate 11. Thus, the video tape cartridge is prevented from unsightly appearance while the butting surfaces 33 are prevented from being damaged by contact with other portions. Further, the magnetic recording tape 2 is effectively prevented from being damaged by dust or dirt that may enter the interior of the front plate 11 when the video tape cartridge is not used since no clearances are defined between the projections 32 and the recesses 31.

Figure 8:
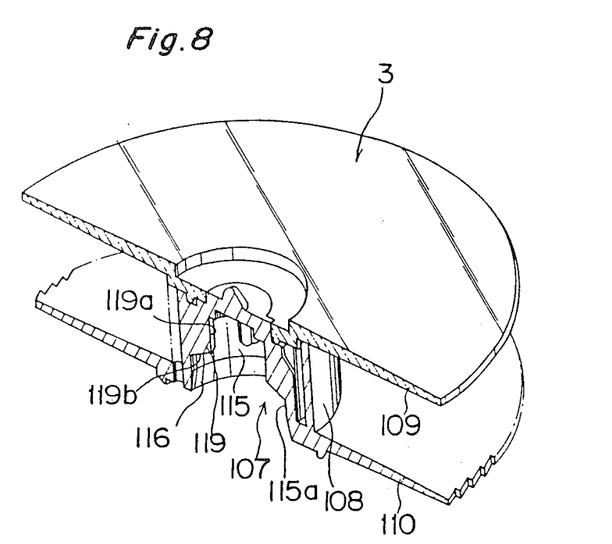
FIG. 8 is a partially fragmented perspective view showing a tape reel.
Figure 9:
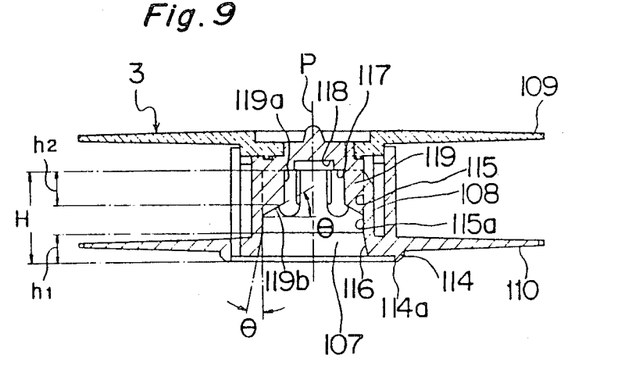
FIG. 9 is a cross sectional view of the tape reel.
Figure 10:
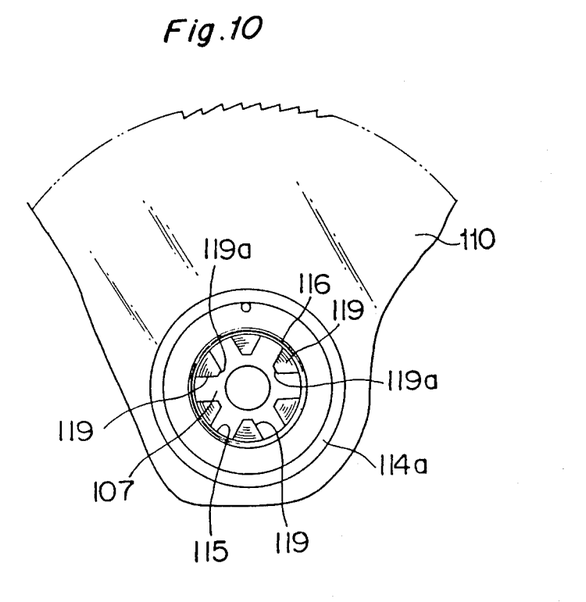
FIG. 10 is a bottom plan view of the tape reel.

In FIGS. 8 through 10, there is shown the tape reel 3 in detail. Each of the tape reels 3 is formed of a plastic resin material, and comprises a hub 108 and a lower flange 110 formed integrally with the same by a plastic forming method. An upper flange 109 is independently formed also by a plastic forming method, and is connected to the upper end surface of the hub 108 by an ultrasonic welding method. The hub 108 is provided in its center with a downwardly-opening hub hole 107 while an annular rib 114 which is coaxial with the axis P of the hub 108 is formed so as to project downward in the lower surface of the tape reel 3.

The inner peripheral surface of the hub hole 107 excluding the lower end portion thereof is formed by a cylindrical wall 115 which is coaxial with the axis P of the hub 108 while the lower end portion is formed as a downwardly-extending tapered surface 116. An escape hole 118 is concavely formed in the center of a horizontal upper end surface 117 provided in the interior of the hub hole 107, for avoiding direct contact with the upper end surface of a drive shaft 120, as hereinafter described, while a plurality of hub pawls 119, six in this embodiment, are projectingly formed in the upper portion of the cylindrical wall 115 at certain intervals such that a projecting end surface 119a of each hub pawl 119 is formed as a vertical surface which is parallel with the axis P of the hub 108 while a lower end surface 119b is formed as a downwardly slanted guide surface. Assuming that the taper angle $\theta$ of the tapered surface 116 is 110° and the angle of inclination $\theta'$ of the lower end surface 119b of the hub 119 is 130° while indicating the depth of an opening defined between a lower end receiving surface 114a of the rib 114 and the upper end surface 117 by H, the height from the receiving surface 114a to the upper end surface 117 by $h_1$ and the vertical length of the projecting end surface 119a of the hub pawl 119 by $h_2$, $h_1$ and $h_2$ are set to be over $\frac{1}{4}$H.

Figure 11:
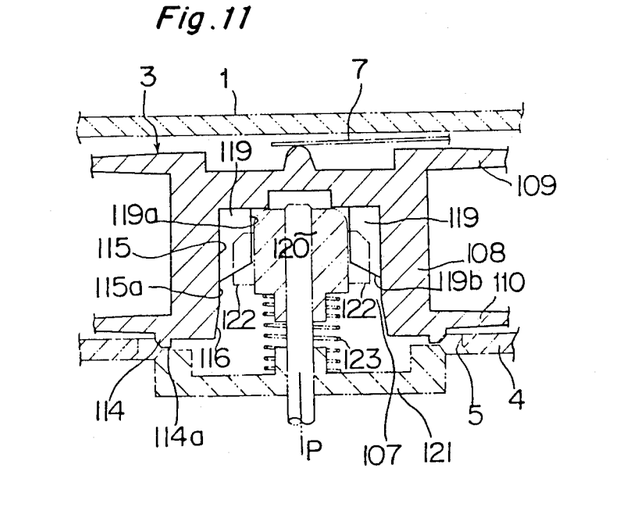
FIGS. 11 through 13 are cross sectional views respectively showing ways of engagement of the hub hole of the tape reel with drive shafts having different standards.
Figure 12:
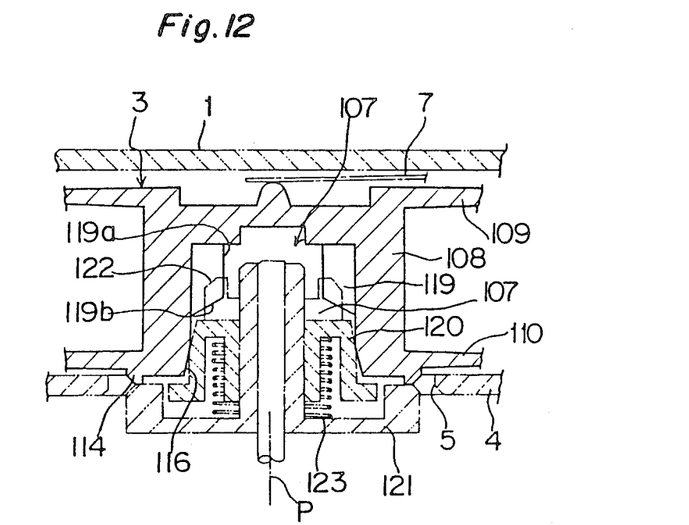
Figure 13:
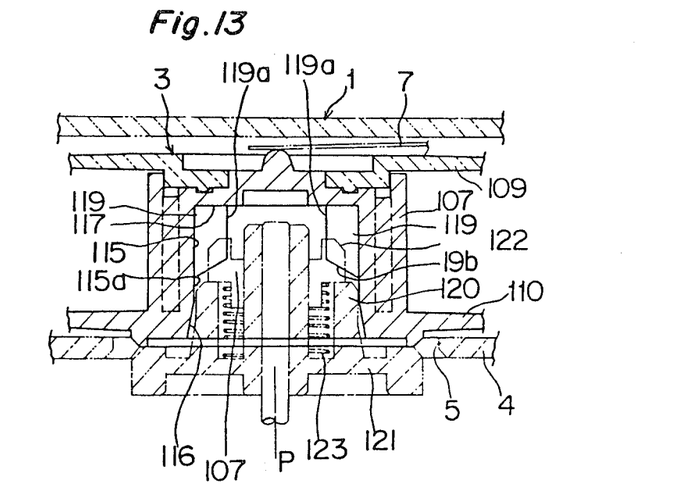

The drive shaft 120 (see FIG. 11) of the video tape recorder is adapted to upwardly project through the center of a tape reel supporting member 121. The drive shaft 120 has a plurality of engaging pawls 122 which are upwardly urged by a spring 123 contained therein. The reel supporting member 121 upwardly urges the entire tape reel 3 and supports the same through the rib 114 while restricting insertion of the drive shaft 120 and the engaging pawls 122 in the hub hole 107 by engagement of the hub pawls 119 with the engaging pawls 122. Since supporting structure and supporting length for the engaging pawls 122 are variable, the external size and the projecting length of the drive shaft 120 may be varied. FIGS. 11 through 13 show various types of drive shafts of video tape recorders with which the tape cartridge according to the present invention can be assembled.

In FIG. 11, there is shown a drive shaft 120 which is, in the shown examples, smallest in external diameter and largest in projecting length and is brought into contact with the projecting end surfaces 119a of the hub pawls 119 so that the axis P of the hub 108 is aligned with the axis of the drive shaft 120. Such a small-diametrical drive shaft 120 enters the hub hole 107 without being in contact with or interfering with the tapered surface 116 and the cylindrical wall 115 thereof, and is guided by the slanted lower end surfaces 119b of the hub pawls 119 to be smoothly engaged with the projecting end surfaces 119a of the hub pawls 119. Upon complete insertion of the drive shaft 120 in the hub hole 107, the engaging pawls 122 positioned in the lower portion of the outer periphery of the drive shaft 120 are forced to be engaged with the hub pawls 119.

FIG. 12 shows another type of the drive shaft 120, which has its outer periphery formed by a downwardly-slanted tapered surface so that the outer tapered surface is guided by the lower tapered surface 116 of the hub hole 107 to be in contact with the same. Upon complete insertion of the drive shaft 120 in the hub hole 107, the upper end of the drive shaft 120 is located below the hub pawls 119 not to interfere with the same, and the engaging pawls 122 supported above the drive shaft 120 alone are engaged with the hub pawls 119 in the aforementioned manner.

FIG. FIG. 13 shows still another type of the drive shaft 120, the upper end of the outer periphery of which is formed as a vertical surface and is guided by the tapered surface 116 of the hub hole 107 to be brought into contact with the cylindrical wall 115, i.e., a vertical wall surface 115a defined between the tapered surface 116 and the slanted lower end surface 119a of the hub pawl 119. Upon complete insertion of the drive shaft 120 in the hub hole 107, the upper end of the drive shaft 120 is positioned below the hub pawls 119 not to interfere with the same, and the engaging pawls 122 supported above the drive shaft 120 are engaged with the hub pawls 119.

It is to be noted that the present invention is not limited to the aforementioned embodiment. For example, the tape reel 3 is not necessarily provided with two flanges 109 and 110.

With respect to the inner peripheral surface of the hub hole 107, the upper end portion in which the hub pawls 119 are projectingly provided is not necessarily formed as a cylindrical wall coaxial with the axis P of the hub 108.

Further, the tape cartridge according to the present invention may be adapted to various types of recording/producing apparatuses having various standards of drive shafts on condition that the drive shaft is brought into contact with either the inner peripheral surface of the hub hole 107 or the tapered surface 116 in the lower portion of the hub hole 107, and is not limited to the shown embodiment in which the drive shaft 120 is in contact with both of the cylindrical wall 115 and the tapered surface 116.. However, it is to be noted that the vertical length of the cylindrical wall 115 is preferably set to be longer than $\frac{1}{4}$ of the aforementioned depth H when a one-standard drive shaft 120 is to be in contact with the cylindrical wall surface 115.

As hereinabove described, the hub hole 107 has the downwardly-extending tapered surface 116 in the opening lower end portion of its inner periphery and the hub pawls 119 projecting from the upper portion of the inner periphery thereof while the projecting ends 119a of the hub pawls 119 are formed as vertical surfaces and the lower end 119b are formed as downwardly-slanting guide surfaces. Therefore, the projecting ends 119a of the hub pawls 119 are positioned inwardly of the tapered surface 116 and the inner peripheral surface of the hub hole 107 at the center of the hub hole 107, so that a small-diametrical drive shaft which is elevated in height can be smoothly guided by the lower ends 119b of the hub pawls 119 to be in contact with the projecting ends 119a thereof without coming into contact or interfering with the lower portion of the inner periphery of the hub hole 107. Since the vertical length $h_2$ of the projecting end 119a of each hub pawl 119 is set to be over $\frac{1}{4}$ of the effective depth H of the hub hole 107, the axis of the small-diametrical drive shaft can be effectively aligned with the axis P of the hub 108. Further, since the height $h_1$ of the tapered surface 116 is also set to be over $\frac{1}{4}$ of the effective depth H of the hub hole 107, the taper angle $\theta$ of the tapered surface 116 can be made small, and therefore a large-diametrical drive shaft which is shortened in height can smoothly and effectively be guided by the tapered surface 116 to be in contact with the lower portion of the inner periphery of the hub hole 107. Particularly when the outer periphery of the drive shaft is brought into contact with the tapered surface 116, the contact surface therebetween can be made large and the axis of the drive shaft is effectively aligned with the axis P of the hub 108.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A recording tape cartridge which comprises:
   a cartridge case having a front wall, side walls and top and bottom walls for defining a chamber for accommodating a recording tape wound around a tape reel means;

a lid member, having a front plate, rotatably mounted on said cartridge case to be rotated between a closed position and an opened position;

an opening defined in a bottom portion of said front plate of said lid member for receiving a standard member of a recording device for locating said cartridge case in said recording device; and butting means projecting from a front edge of said bottom wall to protrude into the opening of said lid member up to a position substantially corresponding to one half the thickness of said front plate when said lid member is in the closed position, said butting means having a generally flat surface in its front end.

2. The recording tape cartridge according to claim 1, wherein said butting means comprises a pair of projections which protrude from said front edge of said bottom wall.

3. The recording tape cartridge according to claim 1, wherein the shape of said butting means is generally an elongated rectangular shape in front view.

* * * * *